(12) United States Patent
Fayeulle et al.

(10) Patent No.: US 6,507,460 B2
(45) Date of Patent: Jan. 14, 2003

(54) GAMMA IRRADIATED LOAD/UNLOAD RAMP AND METHOD FOR PREPARING THE SAME

(75) Inventors: Serge Jacques Fayeulle, Longmont, CO (US); Jason A. Selby, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 6 days.

(21) Appl. No.: 09/872,137

(22) Filed: Jun. 1, 2001

(65) Prior Publication Data
US 2002/0003683 A1 Jan. 10, 2002

Related U.S. Application Data

(60) Provisional application No. 60/209,279, filed on Jun. 2, 2000.

(51) Int. Cl.$^7$ .................................................. G11B 5/54
(52) U.S. Cl. .................................................. 360/254.8
(58) Field of Search .................... 360/254.8, 255.3, 360/255.7, 254.4

(56) References Cited

U.S. PATENT DOCUMENTS

| | | | |
|---|---|---|---|
| 4,217,324 A | 8/1980 | Meek | 264/236 |
| 4,557,885 A | 12/1985 | Kiess et al. | 264/105 |
| 4,686,592 A | 8/1987 | Carroll et al. | 360/97 |
| 5,574,604 A | 11/1996 | Berg et al. | 360/105 |
| 5,585,980 A | 12/1996 | Boutaghou | 360/105 |
| 5,644,451 A | 7/1997 | Chan et al. | 360/105 |
| 5,812,347 A | 9/1998 | Henke | 360/106 |
| 5,870,255 A | 2/1999 | Hornugn et al. | 360/105 |
| 5,936,788 A | 8/1999 | Boutaghou et al. | 360/75 |
| 5,995,326 A | 11/1999 | Thayne et al. | 360/104 |
| 6,078,474 A * | 6/2000 | Koyanagi et al. | 360/254.8 |

* cited by examiner

Primary Examiner—George J. Letscher
(74) Attorney, Agent, or Firm—Merchant & Gould P.C.

(57) ABSTRACT

A gamma irradiated load/unload ramp for a disc drive, the load/unload ramp having a hardened surface that increases the wear properties of the ramp, i.e., reduces debris formation in the disc drive housing that results from the sliding interaction between the load/unload ramp and actuator arm. Typically, the load/unload ramp is hardened through the absorption of about 0.05 to 0.5 Mrad radiation. A method of reducing debris formation in a disc drive having a load/unload ramp includes treating the load/unload ramp with gamma radiation.

22 Claims, 4 Drawing Sheets

GAMMA IRRADIATED LOAD/UNLOAD RAMP AND METHOD FOR PREPARING THE SAME

RELATED APPLICATIONS

This application claims priority of U.S. provisional application Serial No. 60/209,279, entitled "GAMMA IRRADIATED RAMP FOR LOAD UNLOAD APPLICATIONS," filed Jun. 2, 2000.

FIELD OF THE INVENTION

This application relates generally to magnetic disc drives and more particularly to a load/unload ramp for use in a disc drive.

BACKGROUND OF THE INVENTION

Disc drives are data storage devices that store digital data in magnetic form on a rotating storage medium on an information storage disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads in an arc across the surface of the discs. Each of the concentric tracks is generally divided into a plurality of separately addressable data sectors. The recording transducer, e.g. a magnetoresistive read/write head, is used to transfer data between a desired track and an external environment. During a write operation, data is written onto the disc track and during a read operation the head senses the data previously written on the disc track and transfers the information to a host computing system. The overall capacity of the disc drive to store information is dependent upon the disc drive recording density.

The transducers are mounted on sliders or heads via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the transducers move in a plane parallel with the surfaces of the discs.

Typically, such rotary actuators employ a voice coil motor to position the transducers with respect to the disc surfaces. The actuator voice coil motor includes a coil mounted on the side of the actuator body opposite the transducer arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the transducers move across the disc surfaces. The actuator thus allows the transducer to move back and forth in an arcuate fashion between an inner radius and an outer radius of the discs.

When a stop-start contact disc drive is de-energized, the transducers are automatically moved to a storage location or "park" location on the disc surfaces. The park location is typically adjacent and outside the inner or outer periphery of the data storage region of the disc and is typically called a landing zone. This landing zone typically does not contain any useable data as the transducer physically contacts the disc at rest. Consequently, any data stored in this area would likely be lost or compromised. In addition, the landing zone is typically roughened to minimize the stiction of the transducer against the disc surface.

Other disc drives utilize load/unload ramps to facilitate the removal of the transducer away from the disc to a parked position adjacent the disc. The load/unload ramp in a disc drive is typically stationary and located at a peripheral portion of the information storage disc. Removal of the transducer from the disc media is accomplished by the transducer/suspension assembly moving to the outer rim portion of the disc and then traversing an inclined portion of the load/unload ramp to a park location on a flat portion of the load/unload ramp. As such, the transducer is physically "parked" off of the information storage disc surface.

The use of a load/unload ramp to store the transducer under de-energized conditions has several advantages over the use of the traditional landing zone design where the transducer is stored on the disc surface. First, using a load/unload ramp eliminates stiction concerns and friction failures associated with the transducer being de-energized on the landing zone of the disc. Second, information storage discs typically have a protective carbon overcoat which at least in part is required to support the transducer-landing zone interaction. In the absence of this interaction, a thinner carbon overcoat may be utilized on the disc surface. A thinner carbon overcoat on the information storage disc allows for the design of decreased transducer-to-disc media spacing and for a corresponding increase in recording density. Finally, by parking the transducer head off the information storage disc surface on the load/unload ramp, a larger amount of disc space is available for data storage, which also results in an increased recording density.

However, the use of a load/unload ramp in a disc drive has several disadvantages, one of which is that the numerous interactions between the transducer/suspension assembly and the load/unload ramp causes wear and resultant debris formation on the surface of the load/unload ramp. Debris formation inside the disc drive is a major concern in the disc drive industry as it can lead to disc errors and ultimately disc failure. Thus, minimizing friction and wear between the load/unload ramp and the transducer/suspension assembly is a major concern in the disc drive art.

SUMMARY OF THE INVENTION

Against this backdrop various embodiments of the present invention have been developed. One embodiment is a gamma irradiated load/unload ramp and method for preparing a gamma irradiated load/unload ramp for use in a disc drive. The gamma irradiated load/unload ramp has improved wear resistance properties over prior art load/unload ramps and hence show a decreased propensity to form wear debris during normal disc drive operations. The load/unload ramp is made by forming the load/unload ramp preferably from a liquid crystal polymer, placing the ramp in a gamma-field, and irradiating the ramp in an amount sufficient to harden the ramp.

The load/unload ramp is preferably utilized in a disc drive having an information storage disc rotatably mounted on a spin motor where the spin motor is fastened to a base plate. The disc drive includes an actuator assembly for directing a transducer over a surface of the information storage disc, and a hardened load/unload ramp having an absorbed radiation dose of about 0.05 to 0.5 Mrads. The load/unload ramp is positioned adjacent a peripheral portion of the information storage disc for supporting the transducer when the transducer is rotated off of the information storage disc.

These and various other features as well as advantages which characterize the present invention will be apparent from a reading of the following detailed description and a review of the associated drawings.

DETAILED DESCRIPTION

Figure 1:
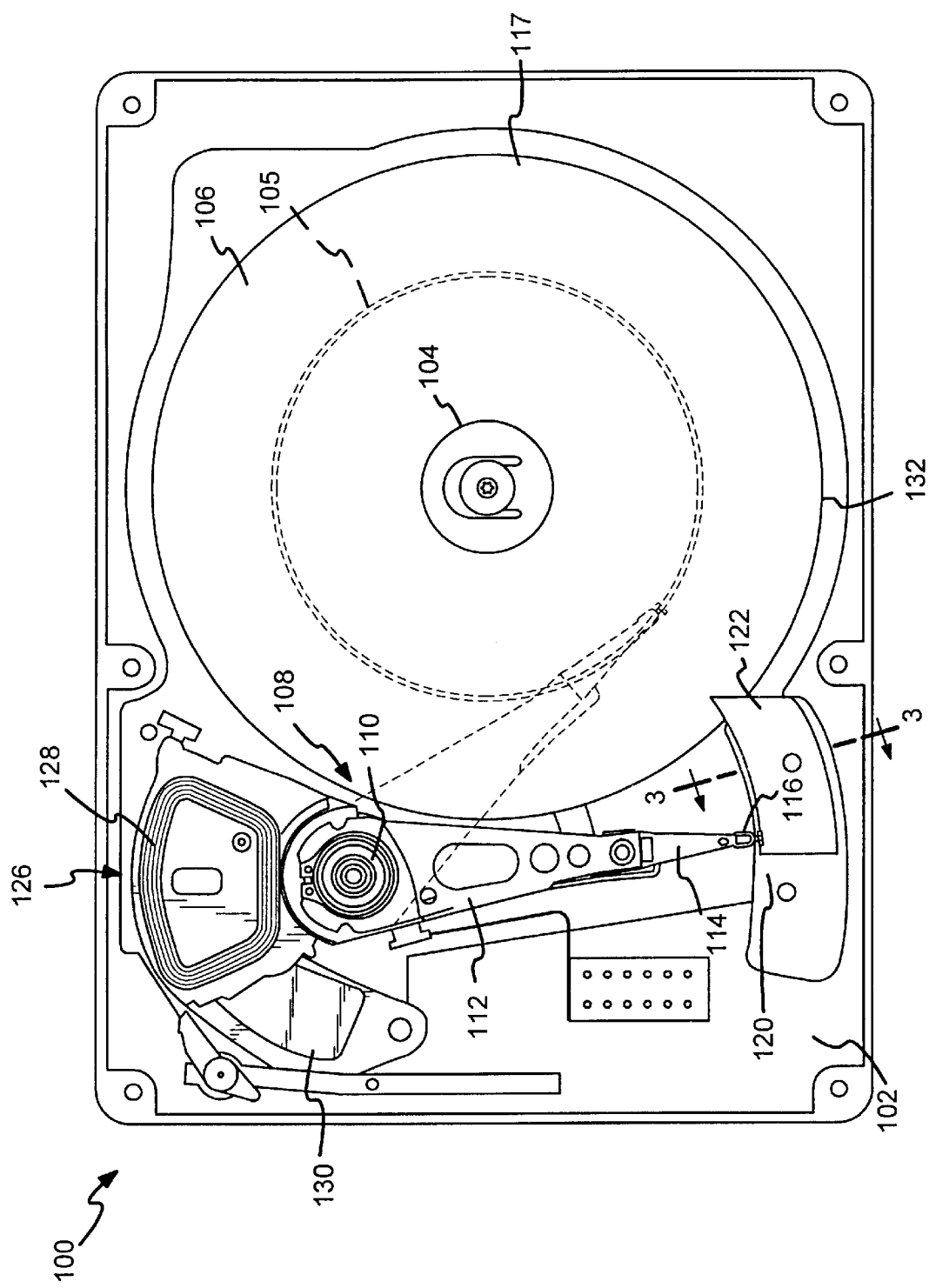
FIG. 1 is a plan view of a disc drive incorporating a preferred embodiment of the present invention showing the load/unload ramp and other primary internal components.
Figure 3:
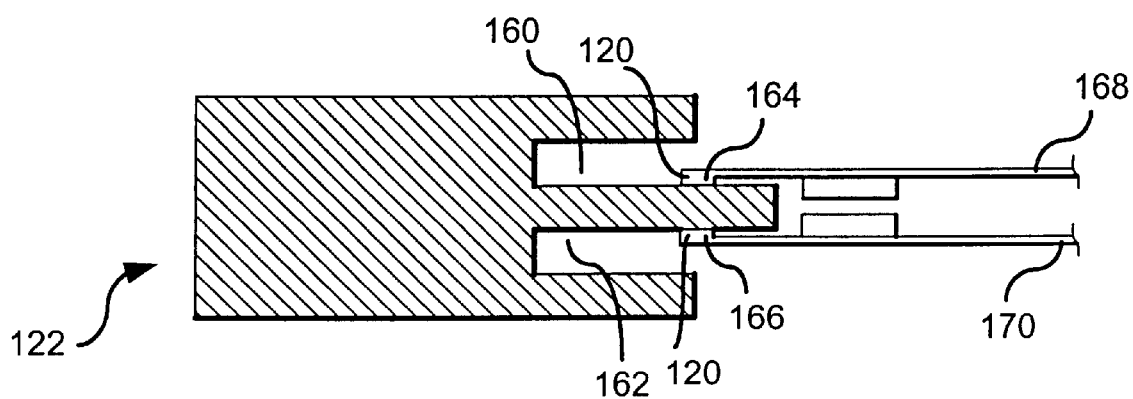
FIG. 3 is a sectional view taken along line 3—3 of FIG. 1 showing the hardened load/unload ramp in accordance with an embodiment of the invention.

A disc drive 100 constructed in accordance with a preferred embodiment of the present invention is shown in FIG. 1. The disc drive 100 includes a base 102 to which various components of the disc drive 100 are mounted. A top cover (not shown) cooperates with the base 102 to form an internal, sealed environment for the disc drive in a conventional manner. The components include a spindle motor 104, which rotates one or more information storage discs 106 at a constant high speed. Information is written to and read from tracks 105 on the discs 106 through the use of an actuator assembly 108, which rotates during a seek operation about a bearing shaft assembly 110 positioned adjacent the discs 106. The actuator assembly 108 includes a plurality of actuator arms 112 which extend towards the discs 106, with one or more flexures 114 extending from each of the actuator arms 112. Mounted at the distal end of each of the flexures 114 is a transducer 116 which is embedded in an air bearing slider (not shown) enabling the transducer 116 to fly in close proximity above the corresponding surface 117 of the associated disc 106. Additionally, extending laterally from the distal end 118 of the flexure 114 is a lift tab 120 (see FIG. 3) for engagement with a load/unload ramp 122 as is described in greater detail below. Note that the flexure lift tab 120 is used purely for illustrative effect, other configurations for interaction with the load/unload ramp are also envisioned to be within the scope of the present invention.

During a seek operation, the track position of the transducer 116 is controlled through the use of a voice coil motor (VCM) 126, which typically includes a coil 128 attached to the actuator assembly 108, as well as one or more permanent magnets 130 which establish a magnetic field in which the coil 128 is immersed. The controlled application of current to the coil 128 causes magnetic interaction between the permanent magnets 130 and the coil 128 so that the coil 128 moves in accordance with the well-known Lorentz relationship. As the coil 128 moves, the actuator assembly 108 pivots about the bearing shaft assembly 110, and the transducers 116 are caused to move across the surfaces of the discs 106.

The spindle motor 104 is typically de-energized when the disc drive 100 is not in use for extended periods of time. At such times the transducers 116 are rotated outward over the surfaces of the discs 106 to the tapered end of the load/unload ramp 122 located at the outer diameter 132 of the information storage discs 106. The transducers 116 traverse onto the load/unload ramp 122 and are secured in position through the use of an actuator latch arrangement (not shown), which prevents inadvertent rotation of the actuator assembly 108 when the transducers 116 are parked. Because the actuator assembly 108 moves back and forth in an arcuate fashion, approximating radial movement, between the inner radius and outer radius of the disc 106, the load/unload ramp 122 has a generally arcuate profile that aligns and lays in the path of movement of the lift tab 120 of the actuator arm 112 when the actuator arm swings to the outer diameter 132 of the disc 106.

Figure 2:
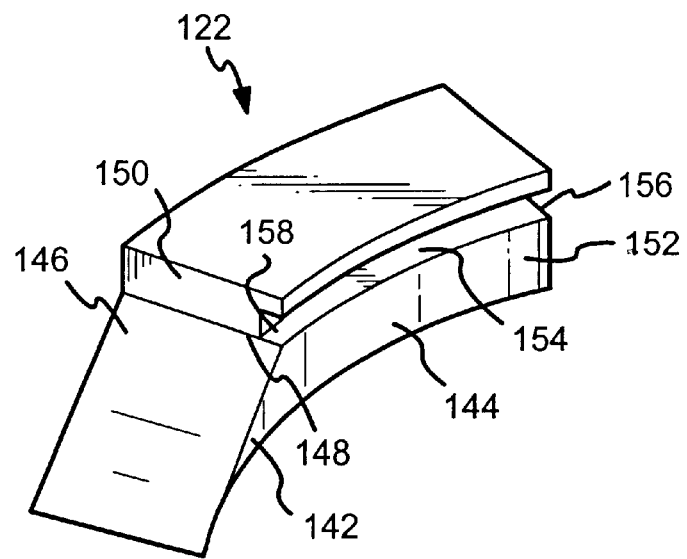
FIG. 2 is a perspective view of a load/unload ramp in accordance with a preferred embodiment of the present invention.

FIG. 2 is a separate perspective view of a load/unload ramp 122 in accordance with the present invention. The structure of the load/unload ramp 122 includes a pick-up portion 142 for receiving and supporting the lift tab 120 when the transducer approaches the outer diameter 132 of the information storage disc 106, and a storage portion 144 that extends away from the information storage disc 106. The pick-up portion 142 forms a gently curved wedge having an inclined surface 146 for sliding engagement with the lift tab 120 at the distal tip of the flexure 114. The generally flat storage portion 144 of the load/unload ramp 122 extends from the pick-up portion of the load/unload ramp 122. In general, the storage portion 144 of the load/unload ramp 122 is a solid body having a side surface 152 that is curved complementary the arcuate movement of the actuator assembly 108. The storage portion 144 extends in a vertical direction slightly above and adjacent the top end 148 of the inclined surface 146 to form a wall and/or face 150. A horizontal groove or slot 154 is formed in the side 152 of the storage portion 144. The groove 154 extends from the wall 150, along the length of the storage portion 144, to the distal end 156 of the storage portion 144. The bottom surface 158 of the groove 154 is substantially parallel to the plane of rotation of the actuator and aligns with the top end 148 of the inclined surface 146 of the pick-up portion 142. The depth and height of the groove 154 is generally uniform and should preferably be sized to receive the lift tab 120 so that when the actuator is rotated away from the disc 106, the flexure lift tab 120 rides up the inclined surface 146 and directly into and along the groove 154. The groove 154 functions to support the lift tab 120 and to prohibit excessive vertical movement of the lift tab 120 during a shock event in the disc drive shutdown or standby condition by confining the lift tab 120 in the groove 154.

When the transducer 116 is to be removed from the information storage disc 106, the actuator assembly 108 is pivoted to the outer diameter 132 of the disc until the lift tab 120 engages and rides along the inclined surface 146 of the pick-up portion 142 of the load/unload ramp 122. The lift tab continues to the top end 148 of the inclined surface 146 and continues along the groove 154 until it comes to rest through actuation of the actuator latch assembly (not shown).

It should be noted that embodiments of the present invention are not limited to load/unload ramps 122 that support transducer heads on only one side of an information storage disc 106. Although only one load/unload ramp 122 is shown in FIG. 2, embodiments of the present invention can function when the load/unload ramp 122 is configured to present on both sides of an information storage disc 106, such as in the sectional view of FIG. 3. Here, the load/unload ramp includes two grooves, 160 and 162, for receiving lift tabs 164 and 166 located on opposing actuator arms 168 and 170 where actuator arm 168 is positioned on one side of the disc and actuator arm 170 is located on the other side of the disc 106.

The description of the load/unload ramp 122 structure is for illustrative purposes only, as any load/unload ramp 122 structure that interacts with the actuator assembly 108 to remove the transducer 116 from the information storage disc 106 is within the scope of the present invention, because the inventive features of the load ramp address problems not particularly dependent on any structural feature(s) of the load/unload ramp.

The load/unload ramp 122 of the invention is preferably molded from a disc drive compatible polymer. Typically, polymers for use with the invention are low friction-low wear plastics, for example, members of the family of Liquid Crystal Polymers. One example of a Liquid Crystal Polymer for use with the invention is Vectra® A430, manufactured by Ticona, a business of Celanese AG (Summit, N.J.). Note, however, that other Liquid Crystal Polymers as well as other low friction-low wear plastics are envisioned to be within the scope of the present invention. Further, other disc drive compatible polymers can be used with the present invention as long as they retain functionality after the hardening process described below.

The load/unload ramp 122 is uniformly hardened through gamma irradiation. The load/unload ramp 122 is irradiated to cause an increase in cross-linking within the load/unload ramp polymer. Increased cross-linking within the load/unload polymer enhances the hardness of the polymer and hence improves the wear properties of the ramp 122.

Gamma ($\gamma$) irradiation, i.e., uncharged high-energy photons, is used to irradiate the load/unload ramp polymer in the preferred embodiment, although other high energy forms of radiation may be used, for example, x-ray radiation. Gamma ray sources are well known in the art. For example, a cobalt 60 source emits $\gamma$ rays at 1.17 and 1.33 MeV. For purposes of this invention any hard gamma source can be used to irradiate the load/unload ramp.

Typically, $\gamma$ ray irradiation of the load/unload ramp polymer is performed when the polymer is molded or otherwise formed into its final shape. It is irradiated to an absorbed dose of about 0.05 to 0.5 Mrad. Preferably, the dose is about 0.1 to 0.3 Mrad, and most preferably it has an absorbed dose of about 0.1 to 0.15 Mrad. In general, absorbed radiation doses to the load/unload ramp 122 under 0.05 Mrad provide insufficient cross-linking to the polymer so as to not provide the desired increase in wear resistance properties. Alternatively, absorbed radiation doses to the load/unload ramp of over 0.5 Mrad, although providing the load/unload ramp with the desired level of cross-linking and hence wear resistance, cause an increased level of brittleness to the ramp polymer, which in itself causes an increase in debris formation. It should be noted that utilizing the highly penetrating radiation of $\gamma$ rays causes the entire polymer composition of the ramp 122 to be cross-linked at the same time, thereby removing any need for positioning the load/unload ramp in relation to the $\gamma$ source, i.e., both direct and indirect gamma radiation will result in hardening of the ramp as long as the ramp polymer absorbs the requisite dose. As such, a fairly large number of load/unload ramps may be irradiated at the same time and with the same efficiency at the $\gamma$ source, thus providing a fairly inexpensive method for hardening a large number of load/unload ramps.

Irradiating the load/unload ramp with $\gamma$ rays has a minimal effect on the frictional characteristics of the ramp. In the case of $\gamma$-irradiated low friction-low wear polymers, the friction coefficient, under conditions of room temperature and standard humidity, remains below 0.2 and preferably around or below 0.15. As such, the irradiated surfaces of the load/unload ramp have good lubricating properties for the sliding interaction with the lift tab 120 at the distal end of the flexure 114.

It is envisioned that the addition of a lubricant layer to the hardened/irradiated load/unload ramp may not be required or even needed. However, the radiation hardened load/unload ramp 122 may be coated with a disc drive compatible lubricant layer. When a lubricant layer is added to the radiation hardened load/unload ramp, a layer of between about 200 Å and about 500 Å thick and is preferably coated onto the ramp surfaces.

Figure 4:
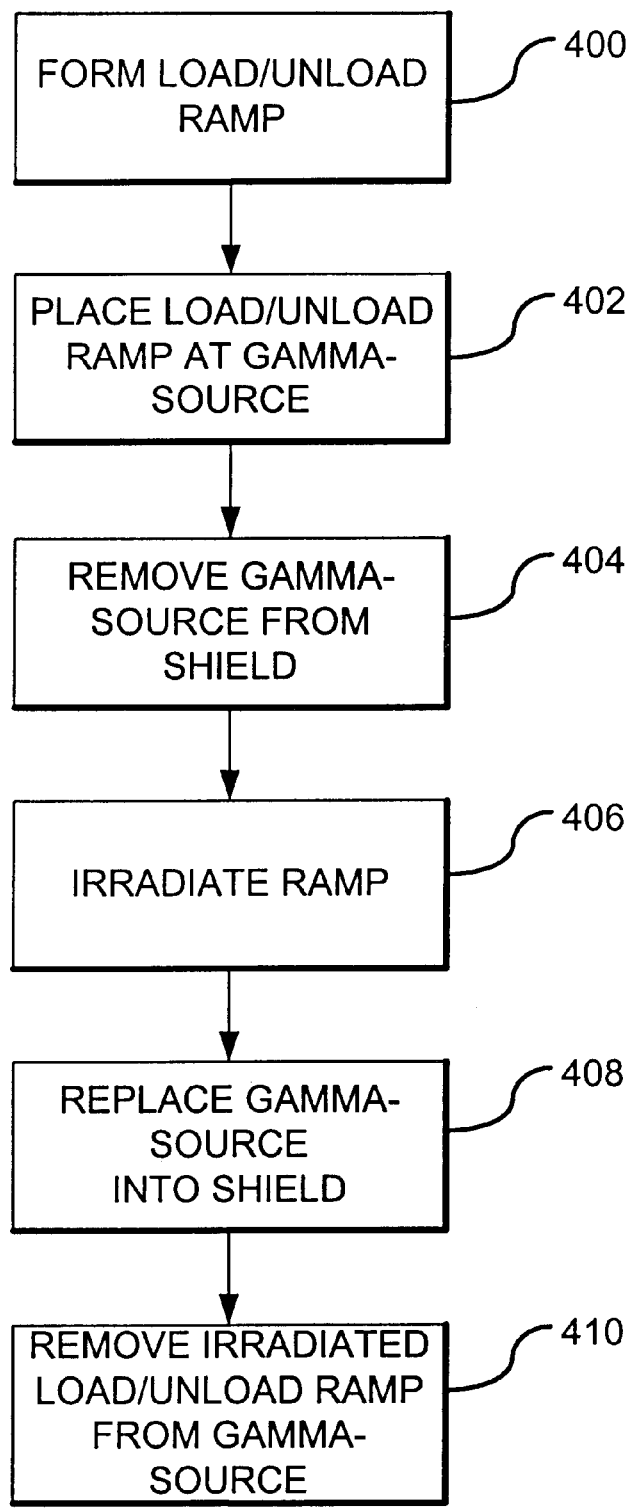
FIG. 4 is a flow chart of a method of preparing a load/unload ramp in accordance with an embodiment of the present invention.

One automated method for preparing a radiation hardened load/unload ramp in accordance with the invention is shown in FIG. 4. In Operation 400, a load/unload ramp is provided or formed from a disc drive compatible polymer, preferably of a liquid crystal polymer. Process control then transfers to Operation 402. In Operation 402, the load/unload ramp is placed at the gamma source. Process control then transfers to Operation 404. In Operation 404, a shield around the gamma source is removed. Process control then transfers to Operation 406. In Operation 406, the load/unload ramp is irradiated for a period of time sufficient to achieve the desired absorbed dose. Process control then transfers to Operation 408. In Operation 408, the shield is replaced around the gamma source and in Operation 410, the irradiated load/unload ramp is removed from adjacent the gamma source. Optionally, the irradiated load/unload ramp may then be lubricated and dried. Additionally, the irradiated ramp may be cleaned. The above described method may be performed on a group of load/unload ramps at substantially the same time—thereby making for an efficient and fairly inexpensive method for hardening each individual load/unload ramp.

It should be noted that the method described above for hardening a load/unload ramp may be performed on other polymer parts that reside within the disc drive, and that further require a hard surface or surfaces, for example, certain parts for the actuator assembly, etc. It is envisioned that similar absorbed doses would impart the wear resistance properties to these parts as was the case for the load/unload ramp.

The following Example is intended to illustrate the above invention and should not be construed so as to narrow its scope.

EXAMPLE

Irradiated Load/Unload Ramp Shows Reduced Debris Formation

A load/unload ramp composed of a liquid crystal polymer was irradiated with $\gamma$ rays at a dose of 0.1 Mrad at standard temperature and humidity. The hardened load/unload ramp was cleaned and subjected to 200 k load/unload cycles. A control or untreated load/unload ramp was also subjected to the same 200 k load/unload cycles for comparison.

Figure 5:
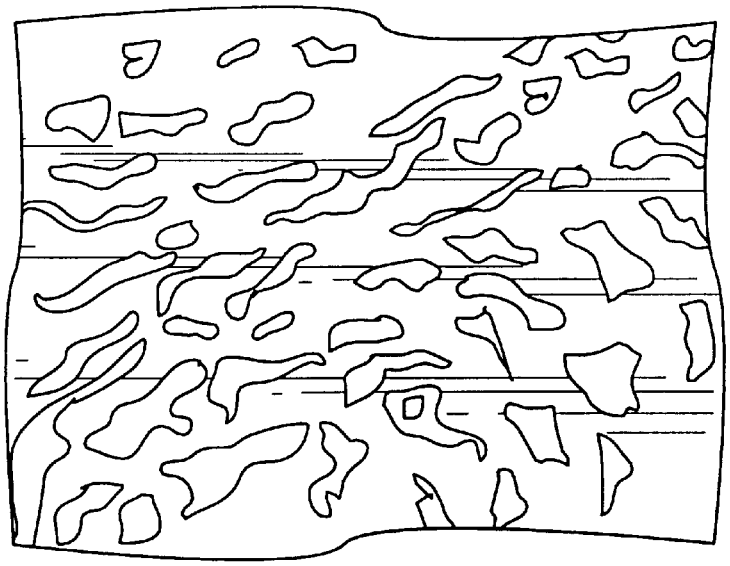
FIG. 5 is a representative schematic of the hardened load/unload ramp after 200 k load/unload cycles.
Figure 6:
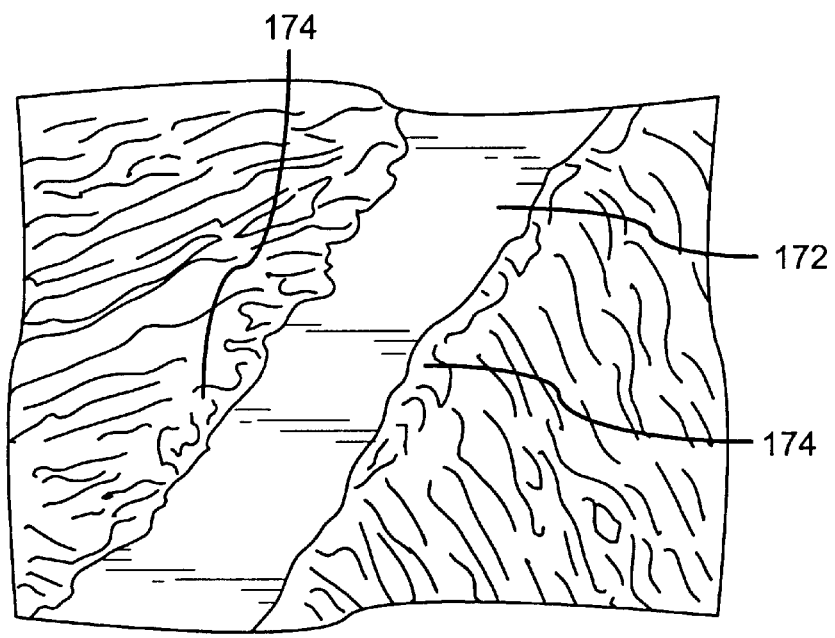
FIG. 6 is a representative schematic of a non-hardened control load/unload ramp after 200 load/unload cycles.

The irradiated load/unload ramp shows a uniform surface having little or no debris formation as a result of the 200 k load/unload cycles. A micrograph of the contact surface of the groove 158 is shown in FIG. 5. However, the control load/unload ramp that did not undergo the irradiation shows a significant amount of wear 172 and debris formation 174 on the corresponding groove surface after the same number of load/unload cycles. (see FIG. 6).

These results indicate that the hardened load/unload ramp of the present invention has significantly greater wear properties as compared to untreated load/unload ramps.

In summary, the present invention may be viewed as a method for preparing a load/unload ramp (such as 122) for a disc drive (such as 100). The method includes providing a load/unload ramp (such as in step 400) and irradiating the load/unload ramp with gamma radiation in an amount sufficient to harden the load/unload ramp (such as in step 406). The method may include irradiating the load/unload ramp with gamma radiation to an absorbed dose of 0.05 to 0.5 Mrads (such as in step 406). Preferably, the method includes irradiating the load/unload ramp with gamma radiation to an absorbed dose of 0.1 to 0.3 Mrads (such as in step 406). More preferably, the method includes irradiating the load/unload ramp with gamma radiation to an absorbed dose of 0.1 to 0.15 Mrads (such as in step 406). The polymer material is preferably a liquid crystal polymer.

The present invention may alternatively be viewed as a disc drive (such as 100) having an information storage disc (such as 106) mounted on a spin motor (such as 104), where the spin motor (such as 104) is fastened to a base plate (such as 102). The disc drive (such as 100) further includes an actuator assembly (such as 108) for directing a transducer (such as 116) over a surface (such as 117) of the information storage disc (such as 106) and a hardened load/unload ramp (such as 122) having an absorbed radiation dose of about 0.05 to 0.5 Mrads. The load/unload ramp (such as 122) being positioned adjacent to a peripheral portion (such as 132) of the information storage disc (such as 106) for supporting the transducer (such as 116) when the transducer (such as 116) is off of the information storage disc (such as 106). The load/unload ramp (such as 122) may have an absorbed radiation dose of about 0.1 to 0.3 Mrads. Preferably, the load/unload ramp (such as 122) has an absorbed radiation dose of about 0.1 to 0.15 Mrads. Further, the load/unload ramp (such as 122) is composed of a polymer material. Preferably, the load/unload ramp polymer material is a liquid crystal polymer. The hardened load/unload ramp (such as 122) preferably has a friction coefficient of less than 0.20 and more preferably has a friction coefficient of less than 0.15. The disc drive (such as 100) may include the hardened load/unload ramp being composed of a liquid crystal polymer that has absorbed a radiation dose of about 0.1 to 0.3 Mrads, and preferably about 0.1 to 0.15 Mrads.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method for preparing a load/unload ramp for a disc drive having improved wear properties, the method comprising the steps of:
    (a) providing a load/unload ramp; and
    (b) irradiating the load/unload ramp with gamma radiation in an amount sufficient to harden the load/unload ramp.

2. The method of claim 1 wherein the irradiating step (b) comprises irradiating the load/unload ramp with gamma radiation to an absorbed dose of 0.05–0.5 Mrad.

3. The method of claim 1 wherein the irradiating step (b) comprises irradiating the load/unload ramp with gamma radiation to an absorbed dose of 0.1–0.3 Mrad.

4. The method of claim 1 wherein the irradiating step (b) comprises irradiating the load/unload ramp with gamma radiation to an absorbed dose of 0.1–0.15 Mrad.

5. The method of claim 1 wherein the irradiating step (b) comprises irradiating the load/unload ramp using a cobalt 60 source.

6. The method of claim 1 wherein the providing step (a) comprises forming the load/unload ramp out of a polymer material.

7. The method of claim 6 wherein the polymer material is a liquid crystal polymer.

8. A disc drive having an information storage disc rotatably mounted on a spin motor, the spin motor fastened to a base plate, the disc drive comprising:
    an actuator assembly for directing a transducer over a surface of the information storage disc; and
    a hardened load/unload ramp having an absorbed radiation dose of about 0.05–0.5 Mrads positioned adjacent a peripheral portion of the information storage disc for supporting the transducer when the transducer is off of the information storage disc.

9. The disc drive of claim 8 wherein the load/unload ramp has an absorbed radiation dose of about 0.1–0.3 Mrad.

10. The disc drive of claim 8 wherein the load/unload ramp has an absorbed radiation dose of about 0.1–0.15 Mrad.

11. The disc drive of claim 8 wherein the load/unload ramp is composed of a polymer material.

12. The disc drive of claim 11 wherein the polymer material is a liquid crystal polymer.

13. The disc drive of claim 12 wherein the load/unload ramp has an absorbed radiation dose of about 0.1–0.3 Mrad.

14. The disc drive of claim 13 wherein the load/unload ramp has an absorbed radiation dose of about 0.1–0.15.

15. The disc drive of claim 11 wherein the hardened load/unload ramp has a friction coefficient of less than 0.20.

16. The disc drive of claim 11 wherein the hardened load/unload ramp has a friction coefficient of less than 0.15.

17. A disc drive load/unload ramp for reducing debris formation in a disc drive, the load/unload ramp comprising:
    a load/unload ramp formed from a low friction-low wear polymer; and
    means for hardening the polymer for reducing debris formation inside the disc drive.

18. The disc drive load/unload ramp of claim 17 wherein the low friction-low wear polymer is a liquid crystal polymer.

19. The disc drive load/unload ramp of claim 17 wherein the load/unload ramp has a friction coefficient of less than 0.15.

20. The disc drive load/unload ramp of claim 17 wherein the means for hardening the polymer is gamma radiation.

21. The disc drive load/unload ramp of claim 20 wherein the load/unload ramp has an absorbed radiation dose of about 0.1 to 0.3 Mrad.

22. The disc drive load/unload ramp of claim 20 wherein the load/unload ramp has an absorbed radiation dose of about 0.1 to 0.15 Mrad.

* * * * *